United States Patent [19]

Seo

[11] Patent Number: 4,896,674
[45] Date of Patent: Jan. 30, 1990

[54] ULTRASONIC DIAGNOSING SYSTEM

[75] Inventor: Yasutsugu Seo, Ootawara, Japan

[73] Assignee: Kabushiki Kaisha Toshiba, Kawasaki, Japan

[21] Appl. No.: 259,458

[22] Filed: Oct. 11, 1988

Related U.S. Application Data

[63] Continuation of Ser. No. 856,960, Apr. 29, 1986, abandoned.

[30] Foreign Application Priority Data

Apr. 30, 1985 [JP] Japan .................................. 60-90923

[51] Int. Cl.$^4$ .............................................. A61B 8/00
[52] U.S. Cl. .............................. 128/661.09; 73/861.25
[58] Field of Search ....................... 128/661.07–661.10; 73/861.25

[56] References Cited

U.S. PATENT DOCUMENTS

| | | | |
|---|---|---|---|
| 4,324,258 | 4/1982 | Heubscher et al. | 128/661.09 |
| 4,509,525 | 4/1985 | Seo | 128/661.09 |
| 4,543,826 | 10/1985 | Ferrari | 128/661.09 |
| 4,583,552 | 4/1986 | Iinuma | 128/661.09 |
| 4,622,977 | 11/1986 | Namekan | 128/661.09 |
| 4,660,565 | 4/1987 | Shirasalin | 128/661.09 |

FOREIGN PATENT DOCUMENTS

| | | | |
|---|---|---|---|
| 0092841 | 4/1983 | European Pat. Off. | 128/661.09 |
| 0100094 | 2/1984 | European Pat. Off. | 128/661.09 |

OTHER PUBLICATIONS

Brandestini M. "UTS Blood Flowmeter Yielding Instantaneous Velocity Profile by Real-Time Phase Detection", Electronics Letters, Vol. 11, No. 8, pp. 183–184, Apr. 17, 1975.
Brandestini, M. "Topoflow-A Digital-Full Range Doppler Velocity Meter", IEEE Trans on Sonic & UTs, vol. SU-25, No. 5 (Sept. 1978).
Fehr, R. "A New MTI Structure w/Inherent A/D Conversion", Conf. Ckt Theory & Design, Lansanne Switzerland 4–8 Sept. 1978.
Barber et al, "A new Time Domain Technique for Velocity Measurements Using Doppler Ultrasound," IEEE Transactions on Biomedical Engineering, vol. BME-32, No. 3, Mar. 1985.
Technical Report No. G 557-2, Stanford Electronics Lab, Stanford University, Technical monolithic Power-Spectrum Centroid Detection, L. Gerzberg, May 1979.

Primary Examiner—Francis Jaworski
Attorney, Agent, or Firm—Finnegan, Henderson, Farabow, Garrett and Dunner

[57] ABSTRACT

An ultrasound diagnosing system includes an ultrasound transmission/reception section, a cross-sectional imaging section, a phase detection section, a filter section, a calculation section, a correction section and a display section. The cross-sectional imaging section causes the ultrasound transmission/reception section to perform ultrasound scanning for sending and receiving ultrasound beams a plurality of times at an identical beam position, and detects cross-sectional information on a living subject from the echo signals. The phase detection section performs quadrature detection of the echo signals. The filter section eliminates low-frequency clutter components from two sets of detected echo components. The calculating section calculates an average blood flow speed by using the outputs of the filter section by autocorrelation. The correction section substracts the average values of the echo components from the two sets of the echo components before the calculation results are obtained, to eliminate the DC components included in the echo components. The display section superposes two-dimensional information on the average blood flow speed from the calculating section on the cross-sectional image and displays a superposed image.

11 Claims, 5 Drawing Sheets

ULTRASONIC DIAGNOSING SYSTEM

This application is a continuation, of application Ser. No. 856,960, filed April 29, 1986, and now abandoned.

BACKGROUND OF THE INVENTION

The present invention relates to an ultrasound diagnosing system for providing an ultrasound cross-sectional image of a living subject using a pulse-echo method, and a two-dimensional distribution image of blood flow information corresponding to the cross-sectional image using a Doppler method, thereby forming a two-dimensional image in which the blood flow information image is superposed on the cross-sectional image.

In a conventional composite system of an ultrasound blood flow measuring apparatus using the Doppler method and an electronic scanning ultrasound imaging apparatus using the pulse-echo method, a blood flow speed at any point of the cross-sectional image can be observed. However, the blood distribution in, e.g., the heart, cannot be one- or two-dimensionally observed.

A system for forming a visible two-dimensional image of blood flow information of a living subject by utilizing a moving-target indicator (MTI) technique used in radar applications is described by K. Namekawa et al., "REALTIME TWO-DIMENSIONAL BLOOD FLOW IMAGING SYSTEM", pp. 541–542; Y. Seo et al., "Real-Time Ultrasonic Blood Flow Imaging System", pp. 543–544; and so on.

Figure 1:
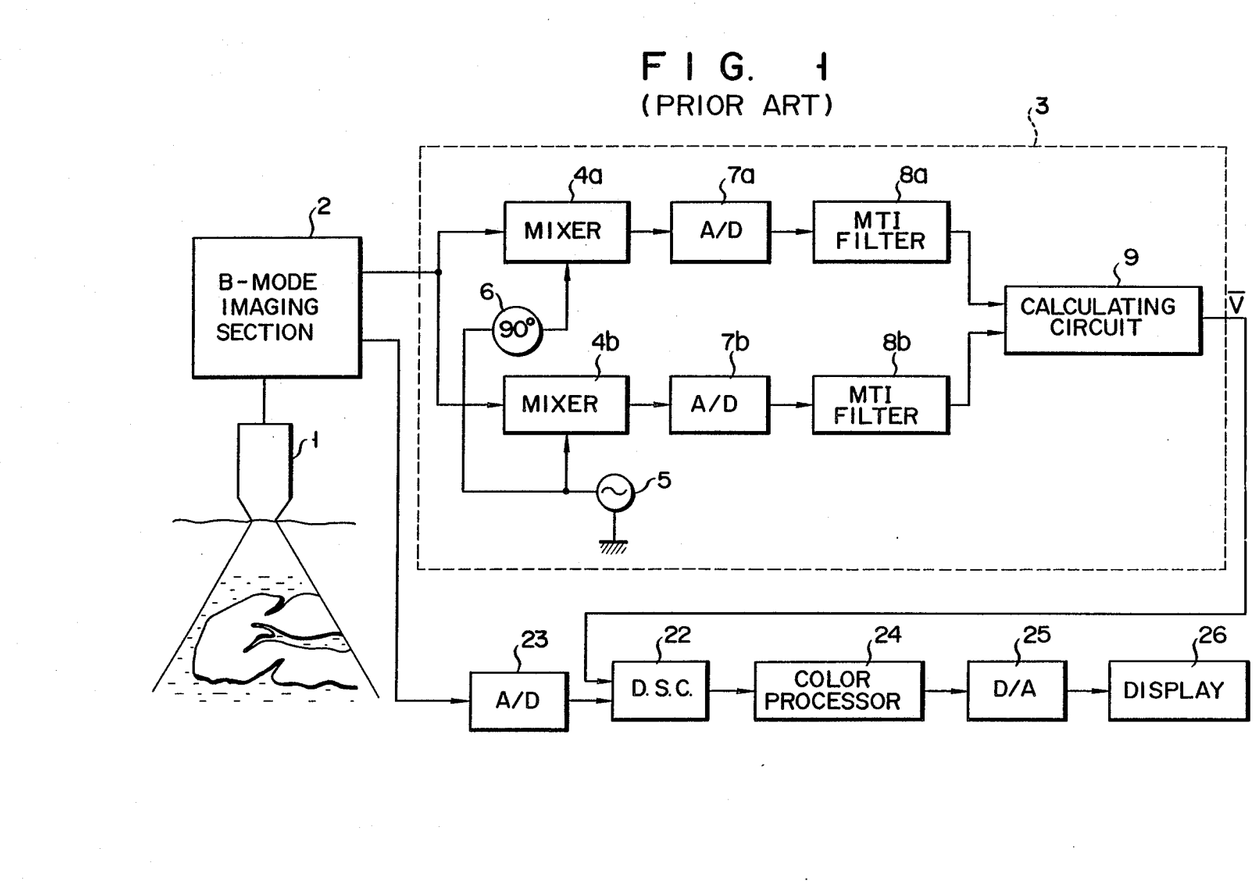
FIG. 1 is a block diagram of a conventional ultrasound diagnosing system.

For example, Japanese Patent Disclosure (Kokai) No. 58-188433 describes a composite system of a cross-sectional imaging apparatus and a blood flow imaging apparatus for forming a two-dimensional image of blood flow information. A typical example of the composite system will be described with reference to FIG. 1. Referring to FIG. 1, an electronic sector-scanning type B-mode imaging apparatus is employed as a cross-sectional imaging apparatus, in combination with the above blood flow imaging apparatus.

Electronic sector-scanning type ultrasound transducer 1 is brought into contact with the skin of a living subject under examination, e.g., the skin near the heart. Ultrasound pulse beams are emitted from transducer 1 in response to drive pulses supplied from electronic sector-scanning type B-mode imaging section 2 (to be referred to as a B-mode section hereinafter). Ultrasound waves, i.e., ultrasound echoes reflected by organic tissue such as the heart muscle or by blood cells are received by transducer 1 and converted thereby to a reception signal, i.e., an electrical signal. The reception signal is supplied to B-mode section 2 and processed thereby according to known techniques to obtain an echo video signal for displaying an ultrasound cross-sectional image.

The reception signal supplied to B-mode section 2 is also transferred without any processing to first and second mixers 4a and 4b in blood imaging section 3. Mixer 4a receives a sinusoidal wave of frequency f0 generated by reference signal generator 5 and shifted 90° by 90° phase shifter 6, as well as the reception signal. Frequency f0 corresponds to the center frequency of the ultrasound wave used in this system. Mixer 4b receives a sinusoidal wave (this wave is not phase-shifted) generated by generator 5, and the reception signal. Mixers 4a and 4b multiply the respective sinusoidal waves with the reception signals from B-mode section 2. This multiplication corresponds to phase detection, using each sinusoidal wave as a reference signal. In other words, Doppler shifts, i.e., the phase shifts of the reception echo components with respect to the sinusoidal waves are detected. In this case, the the phases of the reception echo components are detected by mixers 4a and 4b using the 90°-shifted signal and the signal from generator 5, respectively, using, i.e., a quadrature detection technique.

The echo signals from the living subject upon radiation of the ultrasound pulse beams are signals the time base of which corresponds to the depth in the subject's body. More specifically, the phase detection result of the reception signal for each ultrasound pulse represents that the Doppler shift (motion along the ultrasound beam direction) values at different depths along the ultrasound beam direction are plotted along the time base. In this case, in order to detect a change in Doppler shift as a function of time, ultrasound pulses are emitted a plurality of times at a plurality of beam positions during sector scanning, and the reception signals corresponding to the pulses are sequentially processed.

Mixers 4a and 4b output Doppler signals which are 90° out of phase. These Doppler signals are supplied to first and second A/D (analog-digital) converters 7a and 7b, and are converted to digital signals thereby. The resultant digital signals represent a plurality of different points along the ultrasound beam direction at sampling timings of converters 7a and 7b, and are supplied to first and second MTI filters 8a and 8b by converters 7a and 7b.

Filters 8a and 8b eliminate low-frequency components as unnecessary signal components (so-called clutter components), i.e., the echo signal components from stationary and low-motion portions (relative to blood flow) such as a heart wall. Each MTI filter has a plurality of line memories (the number of which corresponds to the repetition frequency of the pulses at the same beam position) for storing data of one-scanning line, i.e., one-ultrasound pulse data. Each MTI is constituted by a digital filter responsive to a change in data as a function of time for each pixel, on the basis of data corresponding to identical pixels in the plurality of line memories.

Output signals from filters 8a and 8b are supplied to calculating circuit 9. Circuit 9 processes the output signals from filters 8a and 8b according to correlation processing (to be described later) and calculates average speed $\overline{V}$ of a blood flow speed.

Figure 2A:
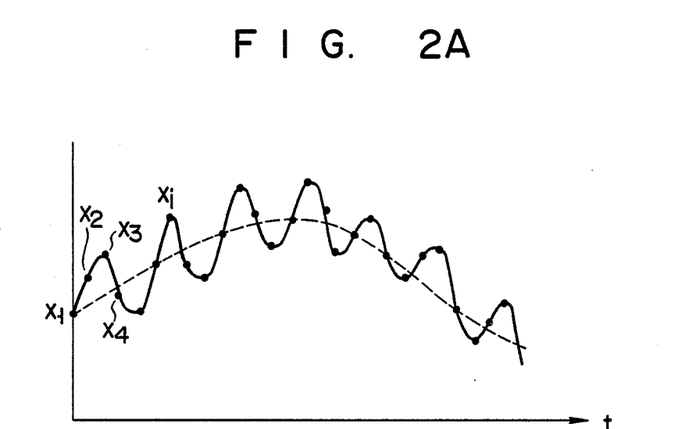
FIGS. 2A and 2B are graphs showing data variations (corresponding to a specific position) in outputs from first and second A/D converters in the system of FIG. 1.
Figure 2B:
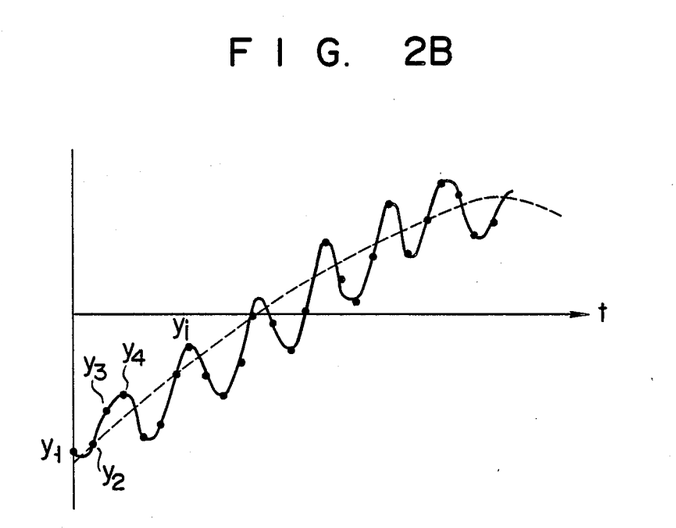

Changes in data values (i.e., data values corresponding to a specific point or pixel) from converter 7a are illustrated in FIG. 2A, and changes in data values from converter 7b are illustrated in FIG. 2B.

As is apparent from FIGS. 2A and 2B, these curves include echo components $x_1$-$x_2$-...-$x_i$-... and $y_1$-$y_2$-...-$y_i$-..., and clutter components (low-frequency variations represented by broken lines in FIGS. 2A and 2B). As previously stated, the variations in outputs from converters 7a and 7b have a 90° phase difference. Output variations $X_a(t)$ and $X_b(t)$ of converters 7a and 7b are given as follows:

$$X_a(t) = \sum_{j=1}^{J} X_{cj}\cos(\omega_{cj}t + \theta_{cj}) + \sum_{j=1}^{J} X_{dj}\cos(\omega_{dj}t + \theta_{dj}) \quad (1)$$

$$X_b(t) = \sum_{j=1}^{J} X_{cj}\sin(\omega_{cj}t + \theta_{cj}) + \qquad (2)$$

$$\sum_{j=1}^{J} X_{dj}\sin(\omega_{dj}t + \theta_{dj})$$

The first terms of the right-hand sides of equations (1) and (2) represent the clutter components, and the second terms thereof represent the echo components: $\bar{\omega}_d << \bar{\omega}_c$.

In ideal MTI filters, the low-frequency components, i.e., the clutter components, can be completely eliminated. In that case, equations (1) and (2) can be rewritten to include only the second terms:

$$X_a(t) = \sum_{j=1}^{J} X_{dj}\cos(\omega_{dj}t + \theta_{dj}) \qquad (3)$$

$$X_b(t) = \sum_{j=1}^{J} X_{dj}\sin(\omega_{dj}t + \theta_{dj}) \qquad (4)$$

Circuit 9 calculates average frequency $\omega_d$ using $X_a(t)$ and $X_b(t)$ of equations (3) and (4). This calculation is performed by a high-speed digital calculation circuit (i.e., a combination of operation circuits for constituting high-speed hardware) using an autocorrelation method.

Frequency $\bar{\omega}_d$ is calculated by autocorrelation as follows:

$$\bar{\omega}_d = -j\{C'_{(0)}C_{(0)}\} = \int \omega S(\omega)d\omega / \int S(\omega)d\omega \qquad (5)$$

where $C_{(0)}$ is the autocorrelation function $C_{(\tau)}$ at $\tau=0$, $C'_{(0)}$ is the derivative of $C_{(\tau)}$ at $\tau=0$.

In the case of discrete $X_a(t)$ and $X_b(t)$, as shown in FIGS. 2A and 2B, equations (1) and (2) can be substituted by equations (1') and (2'):

$$X_a = (x_1, x_2, \ldots, x_n, x_{n+1}) \qquad (1')$$

$$X_b = (y_1, y_2, \ldots, y_n, y_{n+1}) \qquad (2')$$

In this case, frequency $\bar{\omega}_d$ can be calculated as follows:

$$\bar{\omega}_d \alpha \tan^{-1}\left\{\sum_{i=1}^{n}(y_i x_{i+1} - x_i y_{i+1}) / \sum_{i=1}^{n}(x_i x_{i+1} + y_i y_{i+1})\right\} \qquad (6)$$

A detailed arrangement of circuit 9 for performing equation (6) will be described with reference to FIG. 3.

Output data $x_i$ and output data $y_i$ from filters 8a and 8b are stored in memories 10a and 10b in units of pixels. Two of data $x_i$ and $y_i$ stored in memories 10a and 10b, and data $x_{i+1}$ and $y_{i+1}$ succeeding data $x_i$ and $y_i$ by one sampling are selected by first and second switching circuits 11 and 12. Multiplier 13 performs calculations $x_i x_{i+1}$, $y_i y_{i+1}$, $x_i y_{i+1}$, and $y_i x_{i+1}$. The products are stored in third to sixth memories 14 to 17 in units of pixels. First adder 18 performs $\Sigma(y_i x_{i+1} - x_i y_{i+1})$ using storage data in memories 14 and 15. Second adder 19 performs $\Sigma(x_i x_{i+1} + y_i y_{i+1})$ using storage data in memories 16 and 17. Divider 20 performs $\Sigma(y_i x_{i+1} - x_i y_{i+1})/\Sigma(x_i x_{i+1} + y_i y_{i+1})$ using outputs from adders 18 and 19. The calculations of adders 18 and 19 and divider 20 are performed in units of pixels. Data converter 21, using a ROM (read-only memory) for storing conversion table data, performs data conversion in accordance with the calculation of equation (6) for calculating frequency $\bar{\omega}_d$ by an arc tangent of the quotient from divider 20, and with the calculation for obtaining average speed $\bar{V}$ from frequency $\bar{\omega}_d$, thereby obtaining speed $\bar{V}$:

$$\bar{V} = C\bar{\omega}_d/4\pi f_0 \qquad (7)$$

where $f_0$ is the center frequency of the ultrasound beam, and C is the sonic speed.

The operation result from circuit 9 is output in units of pixels constituting the ultrasound cross-sectional image (actual output data is two-dimensional data of $128 \times 64$ dots).

Output data from circuit 9 is supplied to D.S.C. (digital scan converter) 22 of FIG. 1. D.S.C. 22 also receives a digital signal from A/D converter 23 for A/D converting the echo video signal from B-mode section 2. D.S.C. 22 converts the two-dimensional data received from section 3 and circuit 9 to color data, in a color corresponding to speed $\bar{V}$, and the color data is superposed on the echo video signal supplied from B-mode section 2 through converter 23. The scanning scheme of the two-dimensional data is thus changed from ultrasound scanning to TV scanning. An output from D.S.C. 22 is supplied to color processor 24, and is processed thereby in accordance with the color data. An output from processor 24 is supplied to display 26 through D/A (digital-analog) converter 25. Only a blood flow portion in the black-and-white B-mode image is displayed in a color corresponding to the blood flow information (i.e., speed $\bar{V}$). The correspondence between the blood flow information and the display colors is predetermined.

In the conventional system, in order to calculate speed $\bar{V}$ of a two-dimensional image of $128 \times 64$ dots (pixels) in a real-time mode, the number of data outputs (samples) per one dot is limited to, e.g., 8, due to sonic speed limitations. The number of data outputs is thus limited, and the clutter components cannot be sufficiently decreased due to filter transient response. Therefore, the conventional systems cannot provide accurate average blood speed information.

Summary of the Invention

The object of the present invention is to provide an ultrasound diagnosing system wherein a low-frequency component included in an ultrasound Doppler signal can be effectively eliminated with a small number of samples, and an average blood flow speed can be calculated with high precision.

In order to achieve the above object of the present invention, there is provided an ultrasound diagnosing system comprising: an ultrasound transmission/reception section for emitting ultrasound pulse beams into a living subject and receiving echo signals from the subject; a cross-sectional imaging section for controlling transmission timings of the pulse beams and at least one of a beam position and a beam direction of the pulse beams from the ultrasound transmission/reception section, so as to perform ultrasound scanning for emitting and receiving the ultrasound beam a predetermined number of times at an identical beam position, and for obtaining cross-sectional image information on the living subject from the echo signals received at the ultrasound transmission/reception section; a phase detection section for performing quadrature detection of the echo signals to obtain two sets of echo components corresponding to phase shift data at each position of the cross-sectional information, the echo components being adapted to consist of samples corresponding to the number of times of transmission/reception at the identical beam position for each position in the cross-sectional image data; a filter section for eliminating low-frequency clutter components along a time base, in accordance with the two sets of echo components corresponding to the positions of the cross-sectional image and generated by the phase detection section; a calculating section for calculating an average blood flow speed in the living subject for each position of the cross-sectional image information by autocorrelation; and a display for superposing average blood flow speed two-dimensional distribution information from the calculating section on the cross-sectional image information from the cross-sectional imaging section, and for displaying a superposed image, the ultrasound diagnosing apparatus further comprising a correction section for eliminating a DC component from each echo component by an echo component average value from a corresponding one of the two sets of echo components, so as to correct an influence of the clutter components contained in the two sets of echo components on an output from the calculating section.

According to the present invention, there is provided an ultrasound diagnosing system wherein the low-frequency component caused by, e.g., a heart wall of the subject under examination, can be effectively eliminated, an accurate average blood flow speed can be calculated, and blood flow information can be obtained with high precision.

DETAILED DESCRIPTION OF THE PREFERRED EMBODIMENTS

An ultrasound diagnosing system according to a first embodiment of the present invention will be described with reference to FIG. 4.

Figure 4:
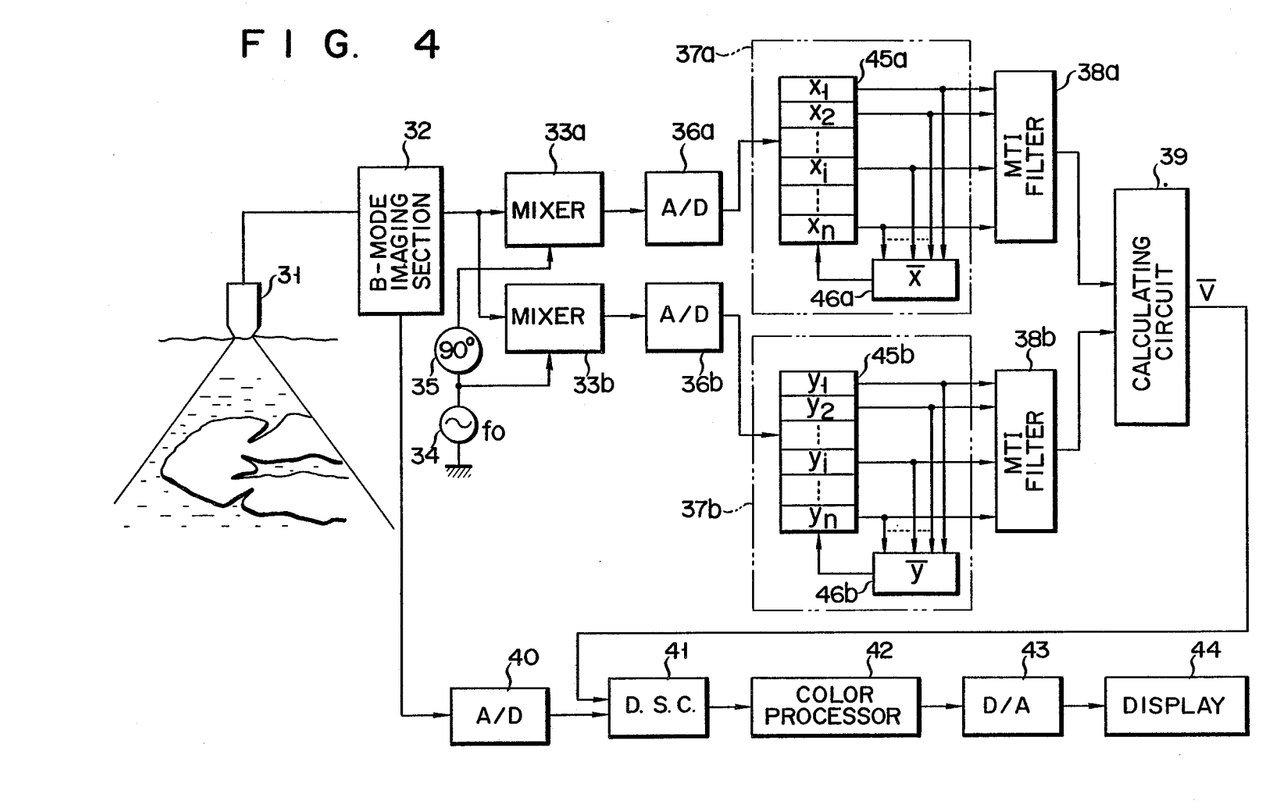
FIG. 4 is a block diagram of an ultrasound diagnosing system according to a first embodiment of the present invention.

The ultrasound diagnosing system of FIG. 4 employs the same electronic sector scanning as in FIG. 1. The ultrasound diagnosing system in FIG. 4 comprises ultrasound transducer 31, B-mode section 32, mixers 33a and 33b, reference signal generator 34, 90° phase shifter 35, A/D converters 36a and 36b, average value subtracters 37a and 37b, MTI filters 38a and 38b, operation circuit 39, A/D converter 40, D.S.C. 41, color processor 42, D/A converter 43, and display 44. The apparatus of FIG. 4 has differences from that of FIG. 1 in that subtracters 37a and 37b are respectively inserted between converter 36a and filter 38a. Transducer 31, B-mode section 32, mixers 33a and 33b, generator 34, shifter 35, converters 36a and 36b, filters 38a and 38b, converter 40, D.S.C. 41, processor 42, converter 43, and display 44 of the system FIG. 4 are substantially the same as transducer 1, B-mode section 2, mixers 4a and 4b, generator 5, shifter 6, converters 7a and 7b, filters 8a and 8b, converter 23, D.S.C. 22, processor 24, converter 25, and display 26, and a detailed description thereof will be omitted.

Subtracters 37a and 37b, respectively inserted between converter 36a and filter 38a and between converter 36b and filter 38b, calculate average values $\bar{x}$ and $\bar{y}$ from echo components $x_i$ and $y_i$ as outputs (in units of pixels) from converters 36a and 36b, and differences $x_i - \bar{x}$ and $Y_i - \bar{y}$, and output these differences.

Subtracters 37a and 37b include first and second memories 45a and 45b for storing components $x_i$ and $y_i$ of each pixel, and first and second multipliers/adders 46a and 46b for calculating average values $\bar{x}$ and $\bar{y}$:

$$x = \sum_{i=1}^{n} x_i/n \text{ and } y = \sum_{i=1}^{n} y_i/n$$

on the basis of the outputs from memories 45a and 45b, calculating differences $x_i - \bar{x}$ and $y_i - \bar{y}$, and updating memories 45a and 45b according to the difference data $x_i - \bar{x}$ and $y_i - \bar{y}$.

Data $x_i - \bar{x}$ and data $y_i - \bar{y}$ respectively calculated by subtracters 37a and 37b are supplied to filters 38a and 38b. Outputs from filters 38a and 38b are supplied to circuit 39.

DC components corresponding to the average values are eliminated by subtracters 37a and 37b from the outputs from converters 36a and 36b, and the low-frequency components of the outputs from converters 36a and 36b are then eliminated by filters 38a and 38b, respectively. Outputs free from DC and low-frequency components are then supplied to circuit 39. Thus, the inputs to circuit 39 are substantially free from the clutter components included in the ultrasound Doppler signal.

Since data from filters 38a, 38b is of the format $x'_i = x_i - \bar{x}$, $y'_i = y_i - \bar{y}$, autocorrelating calculator 39 is in fact identical to conventional calculating means 9 and performs equation (6) on inputs $x_i'$, $y_i'$ which have a smaller dynamic range than inputs such as $x_i$, $y_i$ whose D.C. components have not been removed.

Circuit 39 performs the following calculation:

$$\bar{\omega}_d \propto \tan^{-1}\left\{ \sum_{i=1}^{n} (y_i' x_{i+1}' - x_i' y_{i+1}') / \sum_{i=1}^{n} (x_i' x_{i+1}' + y_i' y_{i+1}') \right\} \quad (8)$$

Circuit 39 uses data substantially free from the clutter components included in the ultrasound Doppler signal to perform the calculation of equation (8) for obtaining average frequency $\bar{\omega}_d$, and the calculation of equation (7) for obtaining average speed $\bar{V}$ from frequency $\bar{\omega}_d$.

In the apparatus of this embodiment as described above, frequency $\omega_d$ and then speed $\bar{V}$ are calculated using signals free from the clutter components included in the ultrasound Doppler signal. Therefore, as compared with the conventional apparatus, high calculation precision can be achieved. A second embodiment of the present invention will be described below.

According to this embodiment, average frequency $\bar{\omega}_d$ is calculated using approximation (8):

$$\sum_{i=1}^{n} [(x_i - x)(x_{i+1} - x) + (y_i - y)(y_{i+1} - y)] =$$

$$\sum_{i=1}^{n} (x_i x_{i+1} + y_i y_{i+1}) + n(x^2 + y^2) -$$

$$2n(x^2 + y^2) =$$

$$\sum_{i=1}^{n} (x_i x_{i+1} + y_i y_{i+1}) - n(x^2 + y^2)$$

Here let us assume that the variance of $x_i$ is $\sigma_x^2$. Then:

$$\sigma_x^2 = \frac{\sum_{i=1}^{n}(x_i - x)^2}{n} = \frac{1}{n}\sum_{i=1}^{n}(x_i^2 - 2x_ix + x^2)$$

$$= \frac{1}{n}\sum_{i=1}^{n} x_i^2 - x^2$$

Therefore:

$$x^2 = \frac{1}{n}\sum_{i=1}^{n} x_i^2 - \sigma_x^2$$

Let us further assume that $$\sigma_x^2 = \frac{m}{n^2} \Sigma x_i^2.$$

The value of m is determined by whether $x_i$ and $y_i$ are sine waves or Doppler signals. More specifically, m=0 when $x_i$ and $y_i$ are sine waves, and m=2 when $x_i$ and $y_i$ are Doppler signals. Hence, the denominator of the fractional term of equation (8) changes to:

$$\sum_{i=1}^{n} (x_i x_{i+1} + y_i y_{i+1}) - n(x^2 + y^2) = \qquad (9)$$

$$\sum_{i=1}^{n} \left[ (x_i x_{i+1} + y_i y_{i+1}) - \{(n-m)/n\} \sum_{i=1}^{n}(x_i^2 + y_i^2) \right]$$

and the numerator of the fractional term of equation (8) change to:

$$\sum_{i=1}^{n} [(y_i - y)(x_{i+1} - x) - (x_i - x)(y_{i+1} - y)] = \qquad (10)$$

$$\sum_{i=1}^{n} \left[ (y_i x_{i+1} - x_i y_{i+1}) + \sum_{i=1}^{n}(xy - xy) - \right.$$

$$\left. \sum_{i=1}^{n} x(y_i - y_{i+1}) - \sum_{i=1}^{n} y(x_i - x_{i+1}) \right] \approx$$

$$\sum_{i=1}^{n} [(y_i x_{i+1} - x_i y_{i+1})]$$

Equations (9) and (10) yield:

$$\bar{\omega}_d \propto \tan^{-1} \left[ \sum_{i=1}^{n} \{(y_i x_{i+1} - x_i y_{i+1})\} / \sum_{i=1}^{n} \{(x_i x_{i+1} + \qquad (11)\right.$$

$$\left. y_i y_{i+1}) - \{(n-m)/n\}(x_i^2 + y_i^2)\} \right]$$

Frequency $\bar{\omega}_d$ can thus be derived from approximation (11).

An embodiment for achieving the above principle will be described with reference to FIG. 5. The same reference numerals in FIG. 5 denote the same parts as in FIG. 4, and a detailed description thereof will be omitted.

Figure 5:
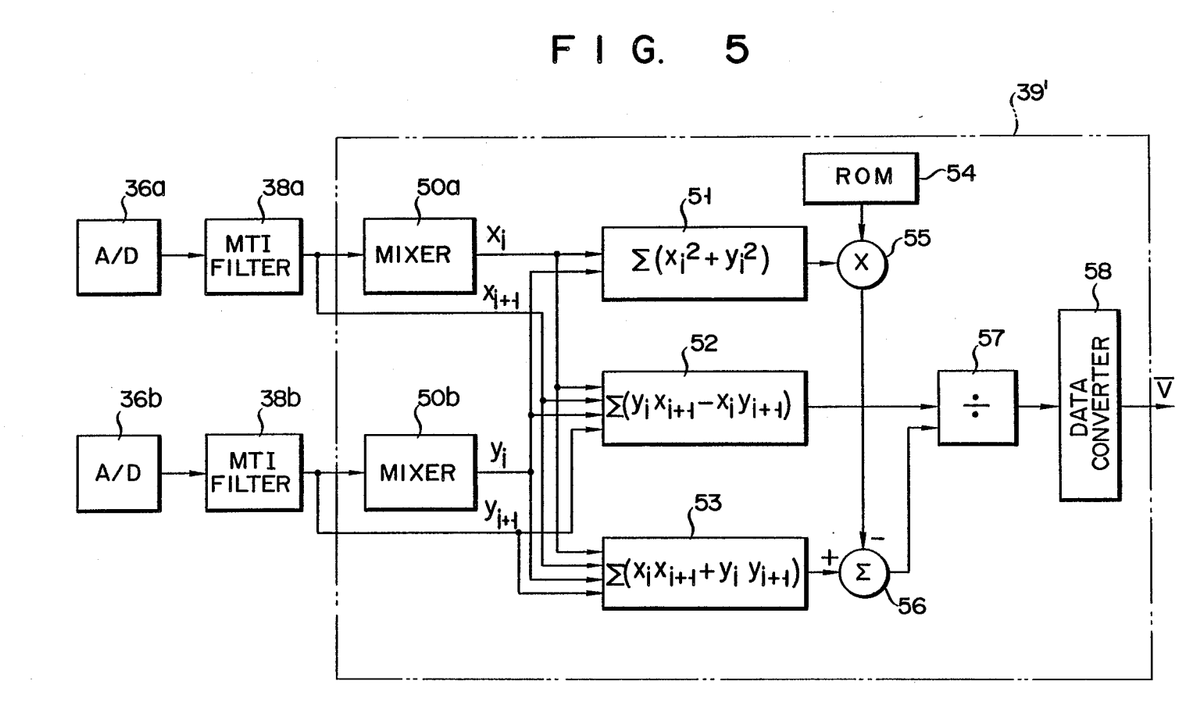
FIG. 5 is a block diagram of an ultrasound diagnosing system according to a second embodiment of the present invention.

The apparatus of FIG. 5 is different from that of FIG. 4 in that average value subtracters 37a and 37b of FIG. 4 are omitted, and that the residual clutter components in the outputs from filters 38a and 38b are eliminated by calculating values of numerator and denominator terms of equation (11) and performing a subtraction of the denominator.

Operation circuit 39' comprises first and second memories 50a and 50b, first to third multipliers/adders 51 to 53, coefficient memory 54, multiplier 55, adder 56, divider 57, and data converter 58.

Memories 50a and 50b temporarily store input data. Outputs from filters 38a and 38b are delayed by memories 50a and 50b by one sample each. Multiplier/adder 52 calculates $\Sigma(x_i^2 + y_i^2)$ on the basis of reflected echo components $x_i$, $x_{i+1}$, $y_i$, and $y_{i+1}$. Multiplier/adder 51 components $x_i$, $x_{i+1}$, $y_i$, and $y_{i+1}$. Multiplier/adder 53 components $x_i$, $x_{i+1}$, $y_i$, and $y_{i+1}$. Memory 54 comprises, for example, a ROM for prestoring coefficients $(n-m)n$ on the basis of the number of calculation data.

Multiplier 55 multiplies data from memory 54 with the output of multiplier/adder 51 to obtain $[(n-m)/n]\Sigma(x_i^2 + y_i^2)$. Adder 56 calculates $\Sigma(x_i x_{i+1} + y_i y_{i+1}) - [(n-m)/n]\Sigma(x_i^2 + y_i^2)$ using the outputs from multiplier/adder 53 and multiplier 55. The outputs from adder 56 and multiplier/adder 52 are supplied to divider 57, and division of approximation (11) is performed by divider 57.

Figure 3:
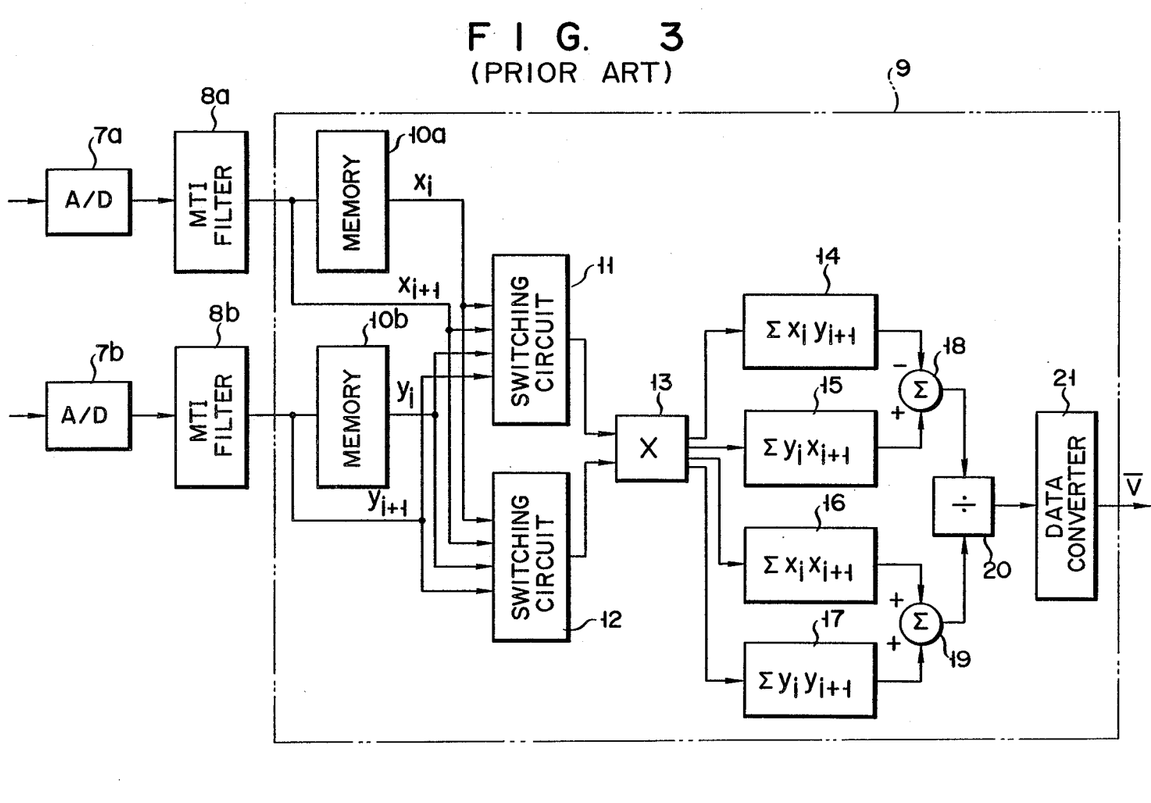
FIG. 3 is a block diagram showing a detailed arrangement of an operation circuit in the ultrasound diagnosing system according FIG. 1.

The quotient from divider 57 is supplied to converter 58 having a ROM table, in the same manner as in converter 21 of FIG. 3. Converter 58 performs data conversion corresponding to the calculation of approximation (11) for calculating frequency $\bar{\omega}_d$ by an arc tangent of the quotient of divider 57, and corresponding to the calculation of equation (7) for calculating speed $\bar{V}$ from frequency $\bar{\omega}_d$.

In the apparatus of this embodiment, circuit 39' performs the calculation of approximation (11) for equation (8). The (residual) clutter components in the outputs from filters 38a and 38b are thus eliminated to obtain speed $\bar{V}$ with high precision.

The present invention is not limited to the first and second embodiments. Various changes and modifications may be made within the spirit and scope of the invention.

What is claimed is:

1. An ultrasound diagnosing system comprising:
   ultrasound transmitting/receiving means for emitting ultrasound pulse beams into a living subject and receiving echo signals from the subject;
   cross-sectional imaging means for controlling transmission timings of the pulse beams and at least one of a beam position and a beam direction of the pulse beams from the ultrasound transmitting/receiving means, so as to perform ultrasound scanning for emitting and receiving the ultrasound beam a predetermined number of times at an identical beam position, and for obtaining cross-sectional image information on the living subject from the echo signals received at the ultrasound transmitting-/receiving means;

phase detecting means for performing quadrature detection of the echo signals to obtain two sets of echo components corresponding to phase shift data at each position of the cross-sectional information, the echo components being adapted to consist of samples corresponding to the number of times of transmission/reception at the identical beam position for each position in the cross-sectional image data;

correction means including averaging means for calculating an average value on the basis of each set of the echo components supplied from the phase detecting means, and subtracting means for subtracting said average value from each set of the echo components;

filter means for eliminating low-frequency clutter components along a time base, in accordance with the two sets of echo components, as provided by said correction means, corresponding to the positions of the cross-sectional image and generated by the phase detecting means;

calculating means for calculating an average blood flow speed in the living subject for each position of the cross-sectional image information by autocorrelation; and display means for superposing average blood flow speed two-dimensional distribution information from the calculating means on the cross-sectional image information from the cross-sectional imaging means, and for displaying a superposed image.

2. A system according to claim 1, wherein said averaging means calculates average values $\bar{x}$ and $\bar{y}$ of echo components $x_i$ and $y_i$ of each position from the two sets of echo components, said subtracting means subtracts the average values $\bar{x}$ and $\bar{y}$ calculated by said average value calculating means from the echo components $x_i$ and $y_i$ to thereby obtain values $x_i' = x_i - \bar{x}$ and $y_i' = y_i - \bar{y}$, and said calculating means comprises means for calculating an average frequency $\bar{\omega}_d$ of a Doppler signal and an average speed $\bar{V}$ from the average frequency $\bar{\omega}_d$ as follows:

$$\bar{\omega}_d \propto \tan^{-1}\left\{ \sum_{i=1}^{n} y_i' x_{i+1}' - x_i' y_{i+1}' / \sum_{i=1}^{n} (x_i' x_{i+1}' + y_i' y_{i+1}') \right\}$$

and $$V = C\bar{\omega}_d / 4\pi f_0$$

where n is an integer, $f_0$ is the center frequency of the ultrasound beam, and C is the sonic speed.

3. A system according to claim 2, wherein said calculating means includes means using conversion table data prestored in a memory to perform a calculation for an arc tangent so as to obtain the average frequency $\bar{\omega}_d$, and a calculation for the average speed $\bar{V}$ derived from the average frequency $\bar{\omega}_d$.

4. A system according to claim 1, wherein said cross-sectional imaging means includes B-mode imaging means for forming a B-mode image.

5. A system according to claim 4, wherein said cross-sectional imaging means includes means for using a sector scan scheme.

6. A system according to claim 1, wherein said filter means includes a digital filter.

7. A system according to claim 1, wherein said display means includes display color control means for displaying the cross-sectional image information and two-dimensional distribution information of the average blood flow speed in different colors.

8. A system according to claim 7, wherein said display color control means includes means for changing display colors in accordance with differences in the average blood flow speed.

9. A system according to claim 7, wherein said display color control means includes means for changing densities of the display color according to differences in the average blood flow speed.

10. An ultrasound diagnosing system comprising:
ultrasound transmitting/receiving means for emitting ultrasound pulse beams into a living subject and receiving echo signals from the subject;

cross-sectional imaging means for controlling transmission timings of the pulse beams and at least one of a beam position and a beam direction of the pulse beams from the ultrasound transmitting/receiving means, so as to perform ultrasound scanning for emitting and receiving the ultrasound beam a predetermined number of times at an identical beam position, and for obtaining cross-sectional image information on the living subject from the echo signals received at the ultrasound transmitting-/receiving means;

phase detecting means for performing quadrature detection of the echo signals to obtain two sets of echo components $x_i$ and $y_i$ corresponding to phase shift data at each position of the cross-sectional information, the echo components being adapted to consist of samples corresponding to the number of times of transmission/reception at the identical beam position for each position in the cross-sectional image data;

filter means for eliminating low-frequency clutter components along a time base, in accordance with the two sets of echo components $x_i$ and $y_i$ corresponding to the positions of the cross-sectional image and generated by the phase detecting means;

calculating means for calculating an average blood flow speed in the living subject for each position of the cross-sectional image information by autocorrelation; and display means for superposing average blood flow speed two-dimensional distribution information from the calculating means on the cross-sectional image information from the cross-sectional imaging means, and for displaying a superposed image;

said calculating means comprising means for calculating an average frequency $\bar{\omega}_d$ of a Doppler signal and an average speed $\bar{V}$ by:

$$\bar{\omega}_d \propto \tan^{-1}\left[ \sum_{i=1}^{n} \{(y_i x_{i+1} - x_i y_{i+1})\} / \sum_{i=1}^{n} \{(x_i x_{i+1} + y_i y_{i+1}) - \{(n-m)/n\} x_i^2 + y_i^2)\} \right]$$

and $$V = C\bar{\omega}_d/4\pi f_0$$

where n is an integer, f0 is the center frequency of the ultrasound beam, C is the sonic speed, and m is "0" when echo components are sine waves and is "2" when the echo components are Doppler signals.

11. A system according to claim 12, wherein said calculating means includes means using conversion table data prestored in a memory to perform a calculation for an arc tangent so as to obtain the average frequency $\bar{\omega}_d$, and a calculation for the average speed $\bar{V}$ derived from the average frequency $\bar{\omega}_d$.

* * * * *

UNITED STATES PATENT AND TRADEMARK OFFICE
CERTIFICATE OF CORRECTION

PATENT NO. : 4,896,674
DATED : January 30, 1990
INVENTOR(S) : YASUTSUGU SEO

It is certified that error appears in the above-identified patent and that said Letters Patent is hereby corrected as shown below:

Claim 2, Column 9, Line 56 (in the formula), change "V" to --$\overline{V}$--;

Claim 10, Column 11, Line 5 (in the formula), change "V" to --$\overline{V}$--.

Signed and Sealed this

Twenty-third Day of June, 1992

Attest:

DOUGLAS B. COMER

*Attesting Officer*  *Acting Commissioner of Patents and Trademarks*